United States Patent
Tomita

(10) Patent No.: US 7,239,341 B2
(45) Date of Patent: Jul. 3, 2007

(54) VECTOR WAVEFORM ROTATION DEVICE

(75) Inventor: Hiroyuki Tomita, Kanagawa-ken (JP)

(73) Assignee: Leader Electronics Corporation, Kanagawa-Ken (JP)

( * ) Notice: Subject to any disclaimer, the term of this patent is extended or adjusted under 35 U.S.C. 154(b) by 405 days.

(21) Appl. No.: 10/873,219

(22) Filed: Jun. 23, 2004

(65) Prior Publication Data

US 2004/0263627 A1    Dec. 30, 2004

(30) Foreign Application Priority Data

Jun. 30, 2003    (JP) ............................. 2003-186853

(51) Int. Cl.
*H04N 17/02*    (2006.01)
*H04N 9/45*    (2006.01)

(52) U.S. Cl. ...................... 348/186; 348/638; 348/505; 345/440.1

(58) Field of Classification Search ................ 348/186, 348/505–508, 184, 638, 654; 345/440.1, 345/648; 324/76.11, 76.12, 121 R
See application file for complete search history.

(56) References Cited

U.S. PATENT DOCUMENTS

| | | | | |
|---|---|---|---|---|
| 3,850,412 A | * | 11/1974 | Olson | 348/186 |
| 4,488,168 A | * | 12/1984 | Mino | 348/186 |
| 4,648,113 A | * | 3/1987 | Horn et al. | 381/1 |
| 5,122,863 A | * | 6/1992 | Zortea | 348/186 |
| 5,175,614 A | * | 12/1992 | Proebstel | 348/186 |
| 5,512,944 A | * | 4/1996 | Ikuzawa et al. | 348/186 |
| 5,589,877 A | * | 12/1996 | Ikuzawa et al. | 348/186 |
| 5,642,161 A | * | 6/1997 | Jefferson | 348/186 |
| 5,808,464 A | * | 9/1998 | Natori et al. | 324/121 R |
| 6,828,981 B2 | * | 12/2004 | Richardson | 345/590 |

FOREIGN PATENT DOCUMENTS

JP    07-312762    11/1995

* cited by examiner

*Primary Examiner*—Victor R. Kostak
(74) *Attorney, Agent, or Firm*—Fish & Richardson P.C.

(57) ABSTRACT

A vector waveform rotation device (60) for rotating a vector waveform displayed on a vector comprises rotation amount setting means (5') for holding a rotation amount $\alpha$, and means (6') for inputting a first color difference signal (B-Y signal) and a second color difference signal (R-Y signal) demodulated from a chrominance signal of a composite video signal as x and y, and rotating a vector (x, y) by generating a vector $(x',y') = (x \cdot \cos\alpha - y \cdot \sin\alpha, x \cdot \sin\alpha + y \cdot \cos\alpha)$ from the vector (x,y) = (first color difference signal, second color difference signal).

4 Claims, 6 Drawing Sheets

VECTOR WAVEFORM ROTATION DEVICE

BACKGROUND OF THE INVENTION

The present invention relates to a device for rotating a vector waveform in a vector waveform display of a vector scope, and more particularly to a device for rotating a demodulated color difference signals, which is employed instead of a phase shifter for shifting the phase of a regenerated sub-carrier.

FIG. 1 is a schematic block diagram of a conventional vector scope that displays the vector waveform of a composite video signal. As shown in FIG. 1, the conventional vector scope comprises input means 1, Y/C separation means 2, synchronizing separation means 3, sub-carrier regenerating means 4, a phase shifter, decoder means 8, and display means 11.

The input means 1 inputs a composite video signal, and outputs the signal to the Y/C separation means 2, the synchronizing separation means 3 and the sub-carrier regenerating means 4. The Y/C separation means 2 extracts a chrominance signal of the composite video signal from the input composite video signal, employing a filter such as a band pass filter, a comb filter and a three dimensional filter, and outputs the chrominance signal to the decoder means 8. The synchronizing separation means 3 extracts a composite synchronizing signal within a synchronizing signal part of the composite video signal from the input composite video signal, employing a negative peak detection circuit. Moreover, the synchronizing separation means 3 separates the composite synchronizing signal into a vertical synchronizing signal and a horizontal synchronizing signal, employing a stable multi-vibrator etc., and generates a burst gate signal based on the vertical and horizontal synchronizing signals to output the burst gate signal to the decoder means 8. The sub-carrier regenerating means 4 generates a sub-carrier signal synchronous with the burst signal from the input composite video signal, employing a PLL, and outputs the sub-carrier signal to the phase shift means 6 in the phase shifter.

The shift amount setting means 5 in the phase shifter sets up a phase shift amount (i.e., an amount for rotating the vector waveform displayed on the display means 11) from the sub-carrier signal input into the phase shift means 6 to the sub-carrier signal output to the phase shift means 6, and outputs the shift amount to the phase shift means 6. The phase shift means 6 shifts the phase of the input sub-carrier signal in accordance with the input phase shift amount, employing a variable phase circuit such as a goniometer, shifts the phase of the input sub-carrier signal, and outputs the sub-carrier signal with phase shifted to 90 degree phase shifting means 7 and the decoder 8. The 90 degree phase shifting means 7 in the phase shifter generates the sub-carrier signal orthogonal to the input sub-carrier signal, employing a 90 degree phase circuit, and outputs the generated signal to the decoder 8. The decoder 8 demodulates the chrominance signal input from the Y/C separation means 2 into color difference signals (an R-Y signal and a B-Y signal), employing the sub-carrier signal input from the phase shift means 6 and the sub-carrier signal input from the 90 degree phase shifting means 7 (i.e., sub-carrier signals orthogonal to each other), and outputs the color difference signals to the display means 11. The display means 11 displays the Lissajour figure with the B-Y signal of the input color difference signals as x axis and the R-Y signal as y axis.

One example of the conventional vector scope was disclosed in Japanese Patent Laid-Open No. 7-312762. The vector scope as described in Japanese Patent Laid-Open No. 7-312762 comprises the improved phase shifter.

[Patent document 1]

Japanese Patent Laid-Open No. 7-312762 (page 3, paragraph 2)

SUMMARY OF THE INVENTION

FIG. 2 is a schematic block diagram of a vector scope without having shift amount setting means 5 and phase shift means 6 as shown in FIG. 1. In other words, the vector scope as shown in FIG. 2 comprises a one-chip decoder device 80. In such vector scope, the vector waveform displayed on the display means 11 can not be rotated on a user's volition.

Accordingly, it is an object of the invention to rotate the vector waveform on the user's volition, even when the vector scope does not have the shift amount setting means 5 and the phase shift means 6.

It is another object of the invention to rotate the vector waveform by a new method.

Other objects of the invention will be apparent from the description of this specification.

To accomplish the above object, this invention provides a vector waveform rotation device (60) for rotating a vector waveform displayed on a vector scope, comprising means (6') for inputting a first color difference signal (B-Y signal) and a second color difference signal (R-Y signal) demodulated from a chrominance signal of a composite video signal as x and y, and rotating a vector (x, y)=(first color difference signal, second color difference signal). Preferably, the vector waveform rotation device (60) according to the invention, further comprises rotation amount setting means (5') for holding a rotation amount α, wherein said means (6') for rotating the vector (x,y) is affine transformation means (6') for generating a vector (x',y')=(x·cos α−y·sin α, x·sin α+y·cos α) from said vector (x,y).

Also, to accomplish the above object, this invention provides a vector waveform rotation method for rotating a vector waveform displayed on a vector scope. The method of the invention comprises a step of setting up a rotation amount α, and a step of inputting a first color difference signal (B-Y signal) and a second color difference signal (R-Y signal) demodulated from a chrominance signal of a composite video signal as x and y, and rotating a vector (x, y) by generating a vector (x',y')=(x·cos α−y·sin α, x·sin αa+y·cos α) from the vector (x,y).

DETAILED DESCRIPTION OF THE INVENTION

The embodiments of the present invention will be described below with reference to the accompanying drawings.

Figure 3:
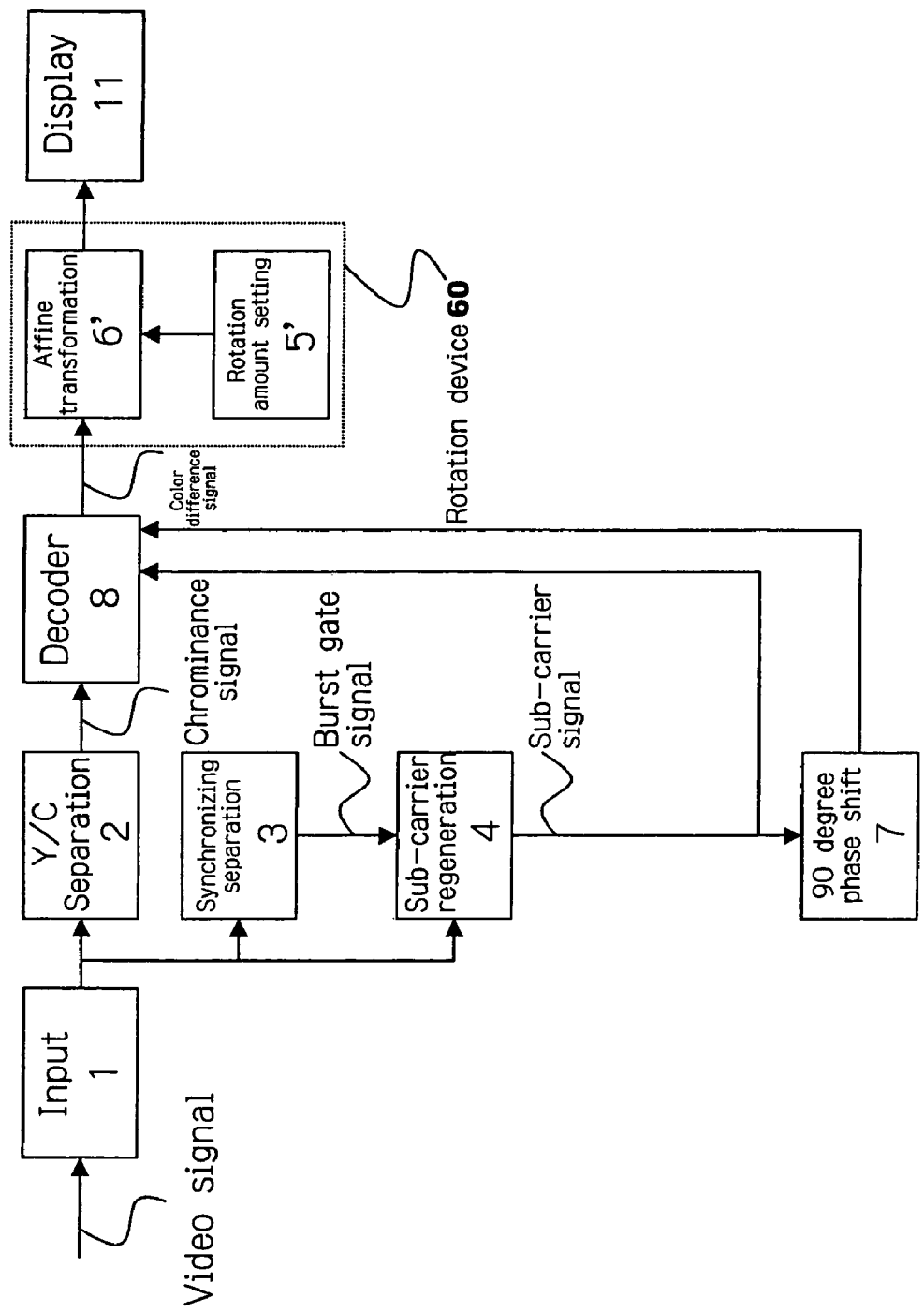
FIG. 3 is a schematic block diagram of a vector scope having a vector waveform rotation device 60 according to the invention.

FIG. 3 is a schematic block diagram of a vector scope having a vector waveform rotation device 60 according to the invention.

Figure 2:
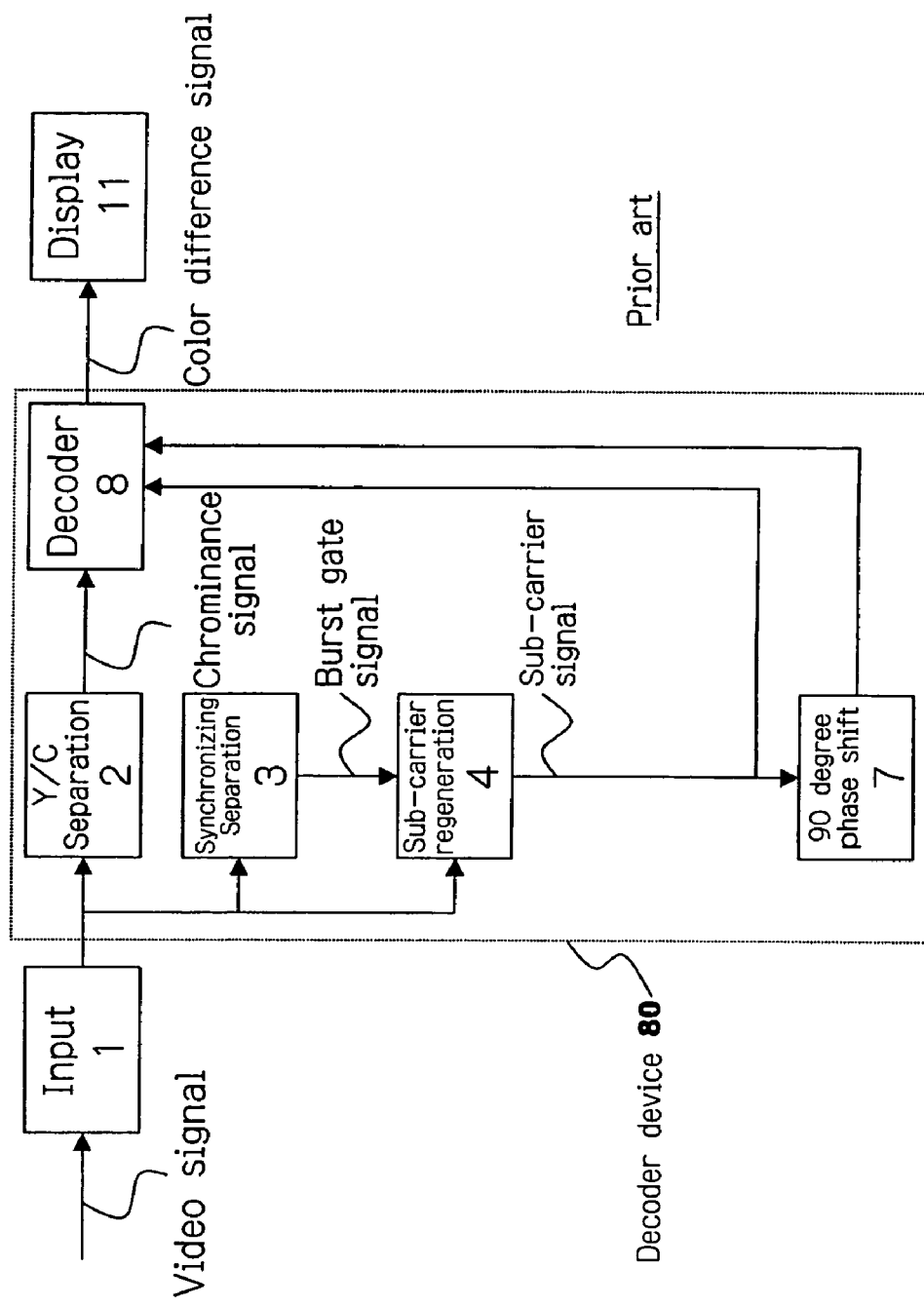
FIG. 2 is a schematic block diagram of a vector scope not having shift amount setting means 5 and phase shift means 6 as shown in FIG. 1.

The functions of the input means 1, the Y/C separation means 2, the synchronizing separation means 3, the subcarrier regenerating means 4, the 90 degree phase shift means 7, the decoder means 8 and the display means 11 in the vector scope as shown in FIG. 3 are the same as those of the vector scope as shown in FIG. 2. Accordingly, detailed description of these means is omitted.

The vector waveform rotation device 60 of the invention comprises rotation amount setting means 5' and affine transformation means 6', as partly shown in FIG. 3.

The rotation amount setting means 5' holds an amount (i.e., rotation amount $\alpha$) for rotating the vector waveform displayed on display means 11.

The affine transformation means 10 transforms color difference signals from the decoder 8 in accordance with the following formula (1), so that the vector waveform displayed on the display means 11 may be rotated, based on the rotation amount $\alpha$.

$$x' = x \cdot \cos \alpha - y \cdot \sin \alpha$$
$$y' = x \cdot \sin \alpha + y \cdot \cos \alpha \quad \text{(Formula 1)}$$

Where x denotes the B-Y signal of the color difference signals before rotation, y denotes the R-Y signal of the color difference signals before rotation, x' denotes the B-Y signal of the color difference signals after rotation, and y' denotes the R-Y signal of the color difference signals after rotation.

The affine transformation means 10 outputs the color difference signals after rotation to the display means 11. The display means 11 displays with the B-Y signal (x') of the input color difference signals as the x axis and the R-Y signal (y') as the y axis.

If the user operates the rotation amount setting means 5' (e.g., the user manually rotates a rotation knob), the vector scope rotates the vector waveform displayed on the display means 11.

Figure 4:
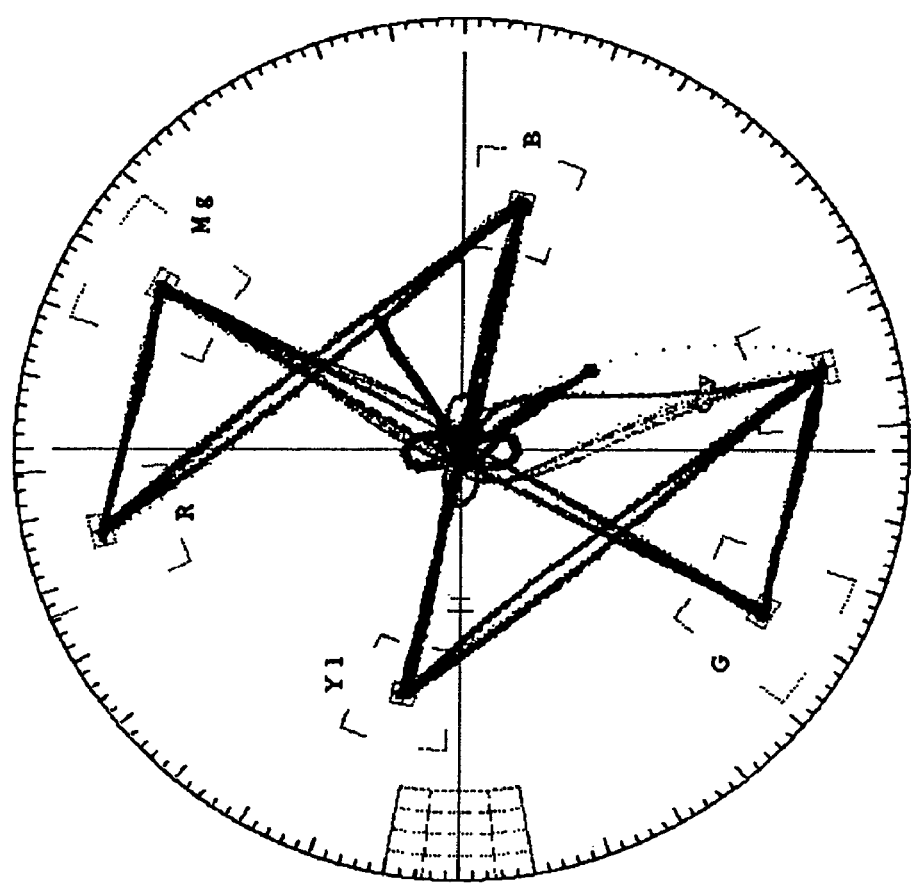
FIG. 4 is a view showing a vector display example of an NTSC color bar signal before rotation.
Figure 5:
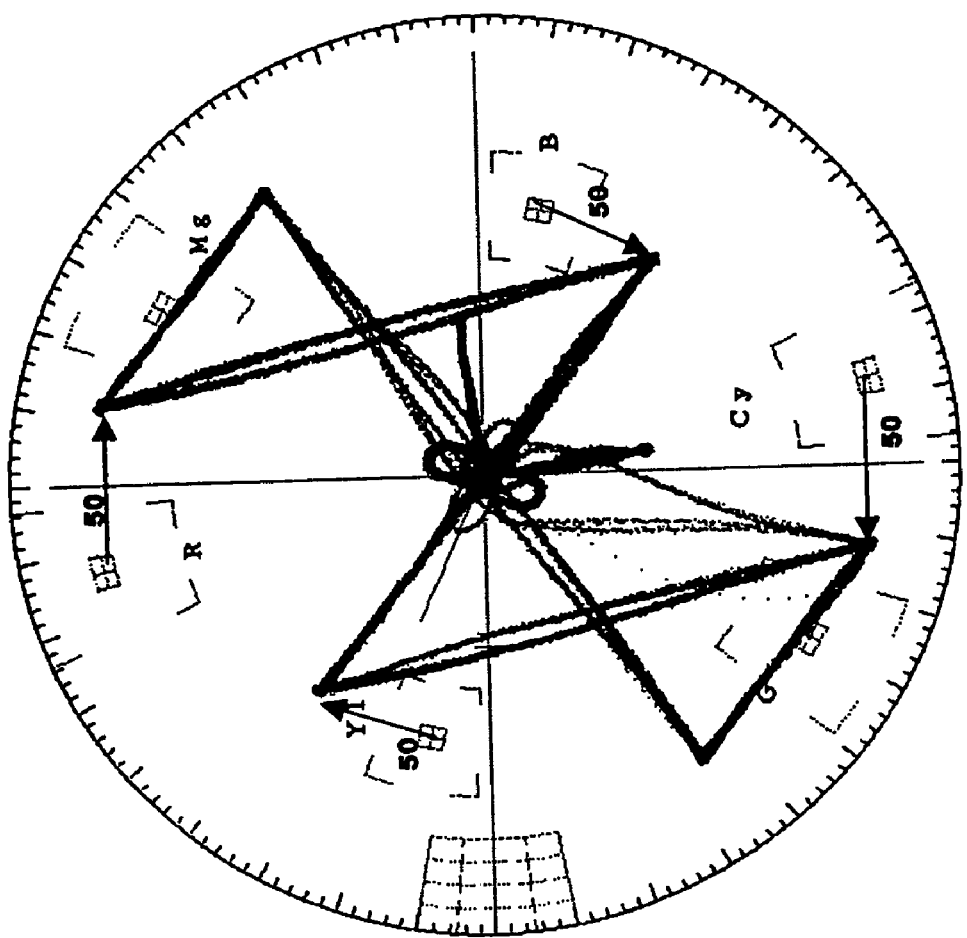
FIG. 5 is a view showing a vector display example of the NTSC color bar signal after rotation.

FIG. 4 shows a vector display example of an NTSC color bar signal before rotation. FIG. 5 shows a vector display example of the NTSC color bar signal after rotation.

For example, when the rotation amount $\alpha$ is set at $-26°$, the vector waveform displayed on the display means 11 is rotated (see the arrow 50 in FIG. 5), as shown in FIGS. 4 and 5.

Figure 1:
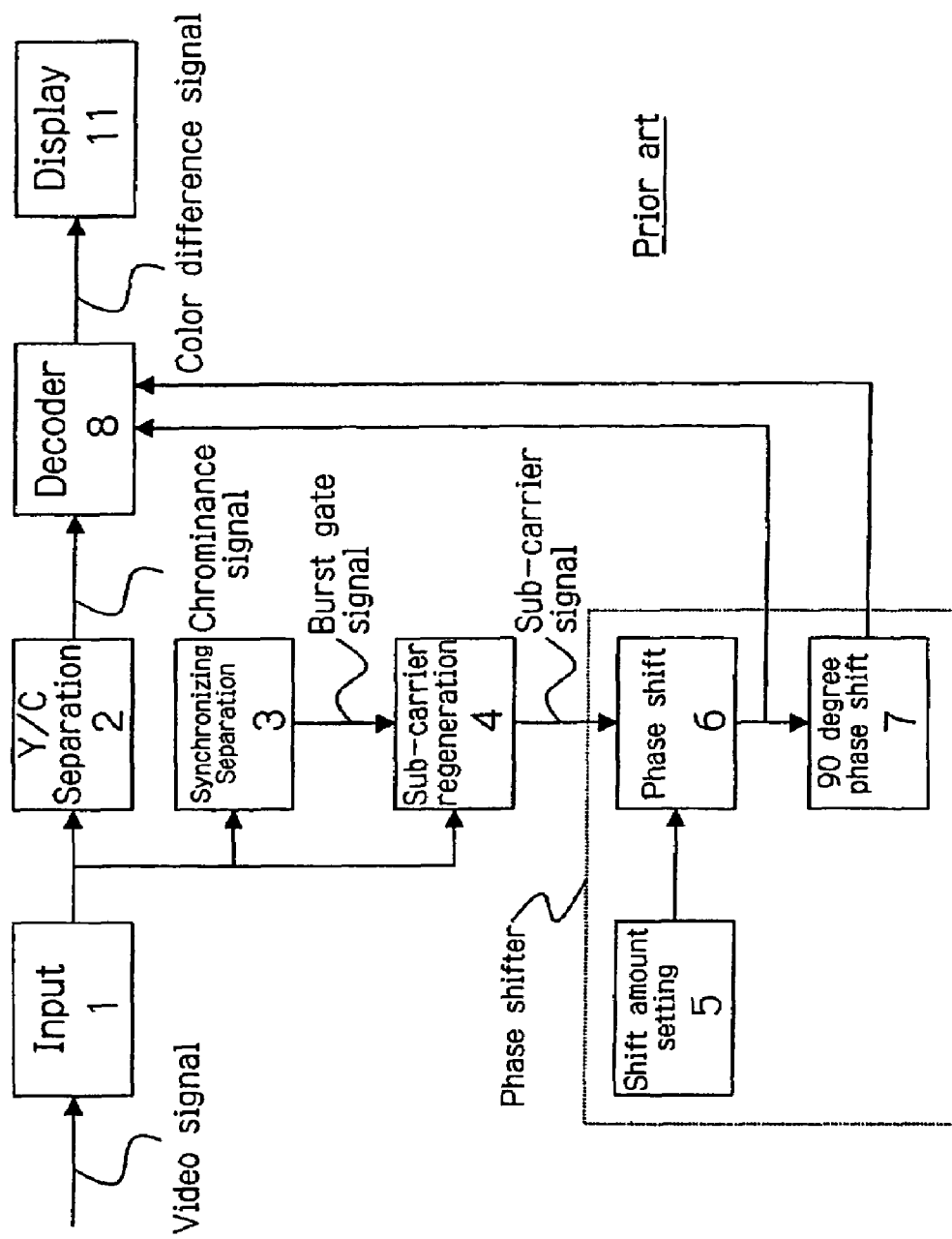
FIG. 1 is a schematic block diagram of a conventional vector scope that displays the vector waveform of a composite video signal.

In this way, it should be understood that the rotation amount setting means 5' and the affine transformation means 6' as shown in FIG. 3 correspond to the shift amount setting means 5 and the phase shift means 6 as shown in FIG. 1. Accordingly, even when the vector scope does not have the shift amount setting means 5 and the phase shift means 6, the vector waveform can be rotated on the user's volition by comprising the vector waveform rotation device 60 of the invention instead of those means.

Figure 6:
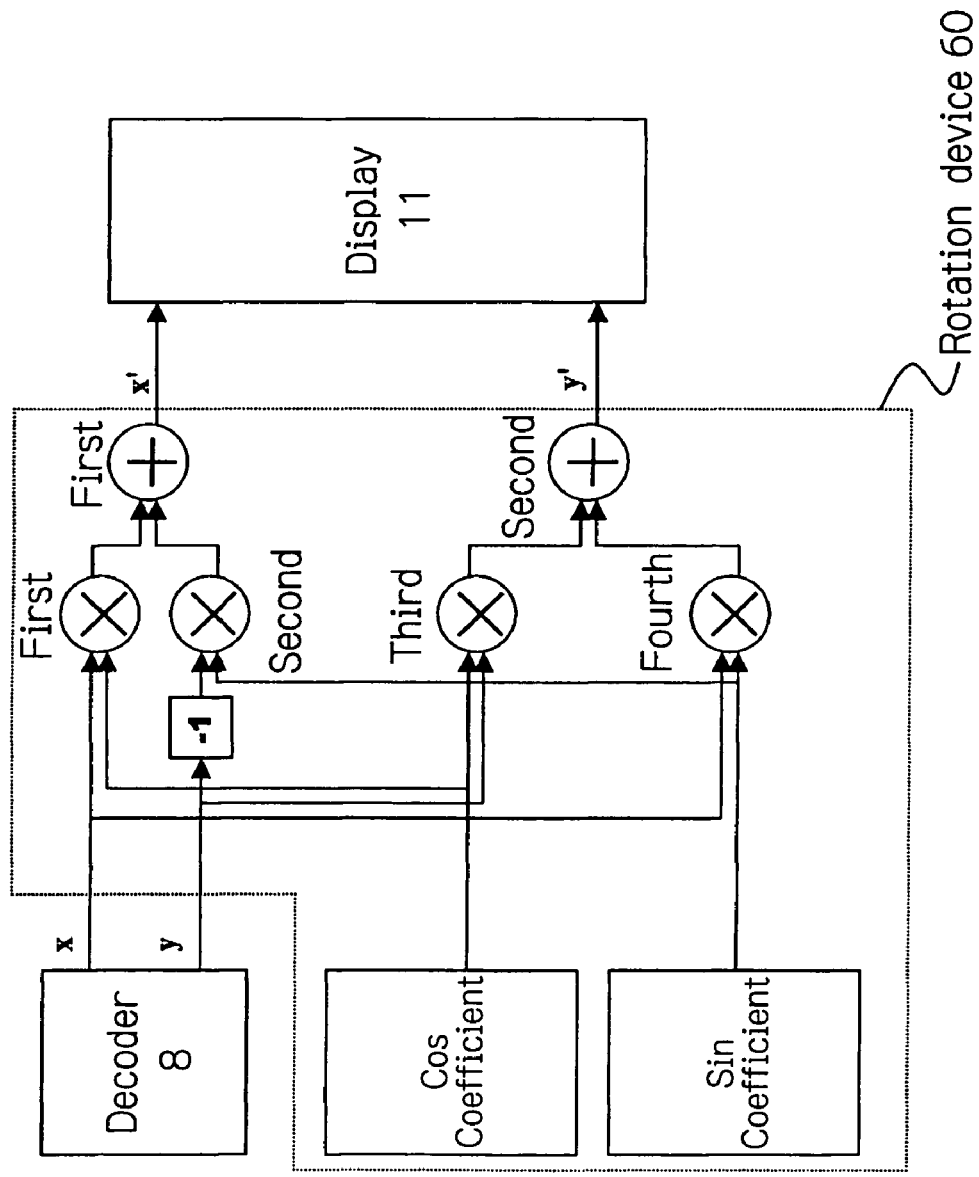
FIG. 6 is a particular block diagram of the vector waveform rotation device 60 of FIG. 3 according to the invention.

FIG. 6 is a particular block diagram of the vector waveform rotation device 60 of FIG. 3 according to the invention.

Coefficient holding means of the rotation amount setting means 5' holds the sin coefficient ($\sin(\alpha)$) and cos coefficient ($\cos(\alpha)$) corresponding to the rotation amount $\alpha$.

A first multiplier of the affine transformation means 6' multiplies the B-Y signal from the decoder 8 and the signal corresponding to the cos coefficient, and outputs the resulting signal to a first adder. A second multiplier multiplies the R-Y signal from the decoder 8 multiplied by $-1$ and the signal corresponding to the sin coefficient, and outputs the resulting signal to the first adder. A third multiplier multiplies the R-Y signal from the decoder 8 and the signal corresponding to the cos coefficient, and outputs the resulting signal to a second adder. A fourth multiplier multiplies the B-Y signal from the decoder 8 and the signal corresponding to the sin coefficient, and outputs the resulting signal to the second adder.

The first adder adds the signal from the first multiplier and the signal from the second multiplier, and outputs the signal (x') as the B-Y signal to the display means 11. The second adder adds the signal from the third multiplier and the signal from the fourth multiplier, and outputs the signal (y') as the R-Y signal to the display means 11. In this way, the formula 1 is materialized.

It should be understood that the present invention is not limited to the plurality of illustrated examples described above, and the examples may be modified in various manners without departing from the spirit of the invention.

What is claimed is:

1. A vector waveform rotation device for rotating a vector waveform displayed on a vector scope, comprising:
    means for inputting a first color difference signal and a second color difference signal demodulated from a chrominance signal of a composite video signal as x and y, and rotating a vector (x, y)=(first color difference signal, second color difference signal); and
    rotation amount setting means for holding a rotation amount $\alpha$, wherein the means for rotating the vector (x,y) is transformation means for generating a vector $(x',y') = (x \cdot \cos \alpha - y \cdot \sin \alpha, x \cdot \sin \alpha + y \cdot \cos \alpha)$ from said vector (x,y).

2. The device of claim 1, wherein the rotation amount setting means for holding a rotation amount $\alpha$ holds the rotation amount uniformly for all scanning lines.

3. The device of claim 2, wherein the vector is rotated uniformly in a unit of all the scanning lines.

4. A vector waveform rotation method for rotating a vector waveform displayed on a vector scope, said method comprising:
    setting a rotation amount $\alpha$; and
    inputting a first color difference signal and a second color difference signal demodulated from a chrominance signal of a composite video signal as x and y; and
    rotating a vector (x, y) by generating a vector $(x',y') = (x \cdot \cos \alpha - y \cdot \sin \alpha, x \cdot \sin \alpha + y \cdot \cos \alpha)$ from said vector (x,y).

* * * * *